June 14, 1927.   1,632,626
K. SCHMIDT
FREQUENCY MULTIPLICATION SYSTEM
Filed May 7, 1925
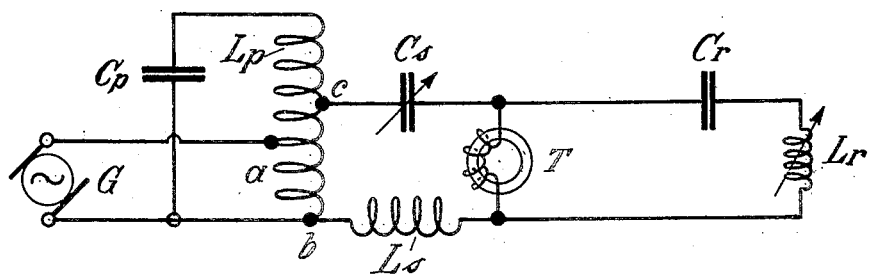
Inventor
Karl Schmidt
By
Attorney Patented June 14, 1927.

1,632,626

UNITED STATES PATENT OFFICE.

KARL SCHMIDT, OF BERLIN-SUDENDE, GERMANY, ASSIGNOR TO C. LORENZ AKTIEN-GESELLSCHAFT, OF BERLIN-TEMPELHOF, GERMANY.

FREQUENCY-MULTIPLICATION SYSTEM.

Application filed May 7, 1925, Serial No. 28,695, and in Germany May 31, 1924.

The present invention relates to an improved method of and means for the multiplication of frequencies occurring in alternating electrical phenomena and is concerned with circuits employing a high frequency generator and a frequency transformer.

In such circuits it is common practice for the high frequency machine to be tuned with the frequency transformer; this however involves various disadvantages in particular when frequency transformer of the Schmidt type is employed, which acts in so distorting the curve of tension of the transformer, that it lies for a prolonged time along the zero line whereby the secondary multiplying circuit of the transformer tuned to the demanded frequency is charged by impulses (see English patent specification 194,007). The high frequency generator is loaded with the highly distorted current wave form whereby the additional losses in the machine itself are considerably augmented and the efficiency of the machine consequently reduced. Furthermore a change in the tuning in the multiplying circuits has a strong reflex action on the machine; it may even happen that during the tuning the machine will suddenly fall out of resonance and race. A further disadvantage is that the machine carries a high wattless load which likewise causes losses. The dimensioning of the transformer tuning circuit is also dependent on the coefficient of self induction of the machine. It is the object of the present invention to overcome these disadvantages.

According to this invention the machine is coupled to an oscillating circuit, which consists of a capacity and a self induction containing either no iron or iron only weakly saturated, the oscillating circuit being tuned to the fundamental frequency of the machine. The oscillating circuit of the transformer is then coupled in any way or by any method to the self induction of this oscillating circuit.

The accompanying drawing is a diagram of connections illustrating by way of example one form of the invention.

The high frequency generator G is directly connected to the self induction $L_P$ at the points $a$ and $b$, the oscillating circuit, consisting of the self induction $L_P$ and capacity $C_P$ being tuned to the frequency of the machine. The primary circuit of the frequency transformer, consisting of the variable capacity $C_S$, the transformer T and the self induction $L_S$, is connected at $b$ and $c$. The secondary multiplying circuit is composed by the inductance coil $L_R$, the capacity $C_R$ and the transformer T. By varying the point of connection $a^R$ to the self induction $L_P$ it can be ensured that the machine shall supply a pure watt current to the oscillating circuit $L_P$, $C_P$, but the tension between $a$ and $b$ must be equal to that producing the watt current of the machine. As the machine works on the primary oscillating circuit $L_P$, $C_P$ and the energy is taken therefrom again for the frequency transformer, the circuit of the machine is only very slightly acted upon by the circuit of the frequency transformer. The entire set is perfectly stabilized while working, and the tremors which frequently occur when tuning with the old system of connections are completely eliminated in the present case. Furthermore the degree of efficiency of the entire set is considerably improved.

What I claim is:

1. A frequency multiplication system comprising in combination an oscillating circuit including a self induction and a capacity, a high frequency generator and a frequency transformer, said self induction and said capacity being tuned to the fundamental frequency of said generator, and said generator and said transformer being connected respectively across portions of said self induction.

2. A frequency multiplication system comprising in combination an oscillating circuit including a self induction and a capacity, a high frequency generator and a frequency transformer, said self induction and said capacity being tuned to the fundamental frequency of said generator, means for connecting said generator across one portion of said self induction and means for connecting said transformer across a different portion of said self induction.

3. A frequency multiplication system comprising in combination an oscillating circuit including an air cored self induction and a capacity and a high frequency generator and a frequency transformer connected respectively across portions of said self induction.

4. A frequency multiplication system comprising in combination a high frequency generator, an oscillating circuit composed of a self induction and a capacity tuned to the fundamental frequency of said generator, said generator being connected across a portion of said self induction and a transformer circuit composed of a frequency transformer, a self induction, a variable capacity and a portion of said first mentioned self induction larger than the portion thereof across which said generator is connected.

5. A frequency multiplication system comprising a high frequency generator a frequency transformer circuit and a circuit interposed between said high frequency generator and said frequency multiplication circuit said circuit including inductance and capacity conductively connected to both said generator and said frequency multiplication circuit and operating to stabilize said high frequency generator and said frequency multiplication circuit.

In testimony whereof I have affixed my signature.

KARL SCHMIDT.